United States Patent
Govaert

(10) Patent No.: US 10,252,462 B2
(45) Date of Patent: Apr. 9, 2019

(54) INFLATABLE CLOSING PLUG FOR PIPES

(75) Inventor: Frederik Johan Govaert, Heerenveen (NL)

(73) Assignee: J. van Beugen Beheer B.V., Hellevoetsluis (NL)

(*) Notice: Subject to any disclaimer, the term of this patent is extended or adjusted under 35 U.S.C. 154(b) by 75 days.

(21) Appl. No.: 13/353,337

(22) Filed: Jan. 19, 2012

(65) Prior Publication Data

US 2012/0192983 A1    Aug. 2, 2012

Related U.S. Application Data

(63) Continuation of application No. PCT/EP2011/004536, filed on Jul. 23, 2010.

(30) Foreign Application Priority Data

Jul. 23, 2009 (GB) .................................. 0912866.1

(51) Int. Cl.
    *B29C 63/24*    (2006.01)
    *B29C 53/60*    (2006.01)
    *F16L 55/134*   (2006.01)

(52) U.S. Cl.
    CPC ............ *B29C 63/24* (2013.01); *B29C 53/605* (2013.01); *F16L 55/134* (2013.01); *Y10T 29/49826* (2015.01); *Y10T 29/53* (2015.01)

(58) Field of Classification Search
    CPC ....... B29C 63/24; B29C 53/605; B29C 53/76; F16L 55/134
    USPC .......... 29/419.1; 138/93; 156/184, 175, 172, 156/169, 166, 156; 242/436, 435, 437, 242/437.1, 437.3
    See application file for complete search history.

(56) References Cited

U.S. PATENT DOCUMENTS

| | | | | |
|---|---|---|---|---|
| 3,112,234 A | * | 11/1963 | Krupp | 156/169 |
| 3,140,058 A | * | 7/1964 | Courtney | 242/436 |
| 3,333,778 A | * | 8/1967 | Levenetz et al. | 242/436 |
| 3,391,873 A | * | 7/1968 | Hardesty | 242/436 |
| 3,411,727 A |   | 11/1968 | Uhlig et al. | |
| 3,634,164 A | * | 1/1972 | Van Hirtum et al. | 156/169 |
| 3,969,812 A |   | 7/1976 | Beck | |
| 3,977,614 A |   | 8/1976 | Hardwick | |
| 4,614,206 A | * | 9/1986 | Mathison et al. | 138/93 |
| 4,627,470 A | * | 12/1986 | Carruthers | 138/93 |
| 4,838,971 A | * | 6/1989 | Cacak | 156/173 |

(Continued)

FOREIGN PATENT DOCUMENTS

| | | |
|---|---|---|
| DE | 2933709 A1 | 3/1981 |
| EP | 0543458 A1 | 5/1993 |

(Continued)

*Primary Examiner* — Christopher M Koehler
(74) *Attorney, Agent, or Firm* — Ramin Amirsehhi; David P. Owen; Philip Tsai

(57) ABSTRACT

An apparatus for forming an inflatable closing plug has a winding head rotatable around a path defining a winding plane. The winding head is arranged to dispense one or more continuous lines from a supply of line via a guide arrangement. A preform is rotationally supported on an axis at a shallow angle with respect to the winding plane such than the winding plane intersects the preform. By providing a spreading arrangement to locate the windings on the preform over a band having a width perpendicular to the winding plane, a smoother distribution of windings can be achieved.

9 Claims, 10 Drawing Sheets

(56) References Cited

U.S. PATENT DOCUMENTS

| | | | |
|---|---|---|---|
| 5,259,901 A | | 11/1993 | Davis et al. |
| 5,477,886 A | * | 12/1995 | Van Beugen et al. .......... 138/93 |
| 6,050,518 A | * | 4/2000 | Ninet et al. .................... 242/436 |
| 2003/0052212 A1 | * | 3/2003 | Anderson et al. ............ 242/436 |
| 2005/0184188 A1 | * | 8/2005 | Weg ........................... 242/447.1 |

FOREIGN PATENT DOCUMENTS

| | | |
|---|---|---|
| GB | 1101280 | 1/1968 |
| GB | 1467236 | 3/1977 |

\* cited by examiner

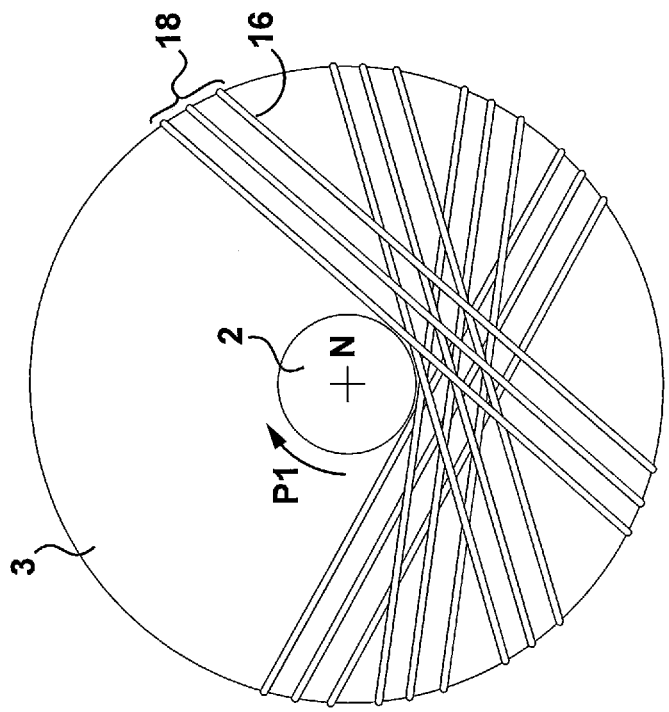
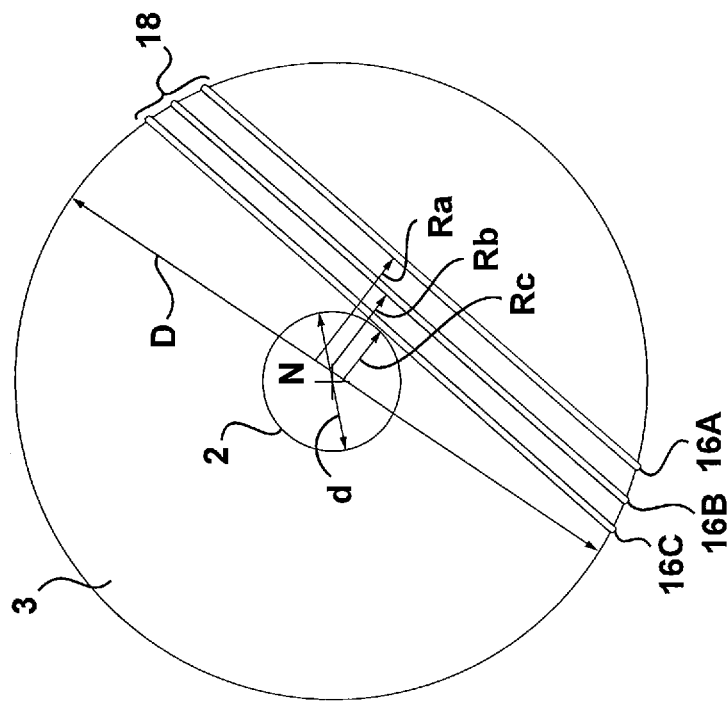
Fig. 2A
Fig. 2B

INFLATABLE CLOSING PLUG FOR PIPES

RELATED APPLICATIONS

This application is a continuation and claims priority to International Application Serial No. PCT/EP2010/004536 filed Jul. 23, 2010. This application claims priority to British patent application 0912866.1, filed Jul. 23, 2009. All related applications incorporated by reference in their entirety as if fully disclosed herein.

BACKGROUND OF THE INVENTION

1. Field of the Invention

The invention relates to a method for manufacturing an inflatable closing plug for pipes, in particular comprising a balloon-like element of elastic material. The invention further relates to inflatable closing plugs of improved design, to methods of closing a pipe with the plug and to an apparatus for manufacturing an inflatable closing plug.

2. Description of the Related Art

Inflatable plugs for closing pipes, for example gas pipes, are known. In use they are inserted into an opening in a pipe while deflated, whereafter the balloon-like element is filled with a pressurized fluid so that the balloon inflates to a widened state and closes the passage of the pipe. The pressurized fluid may be compressible or incompressible, for example compressed air, nitrogen, hydraulic oil or water. In order that the balloon is able to exert sufficient pressure on the inner wall of the gas pipe, the balloon has a limited freedom of axial extension. To this end, a separate sheath of woven material is arranged around the balloon. This separate sheath has limited extensibility so that, when the balloon is inflated, it reduces or substantially prevents extension of the balloon axially along the pipe. The inner-pressure of the balloon is instead applied radially against the inner wall of the pipe so that an adequate closing pressure can be obtained. The sheath may also be used to limit radial expansion.

Manufacture of a balloon with a separate sheath therearound is quite time-consuming. Additionally the working diameters of such balloons are limited, meaning they are usable to close only a small range of pipe diameters. This disadvantageously means that an extensive variety of balloons with different nominal working diameters must be used and held in stock. Examples of inflatable plugs having balloons with separate sheaths are known. WO2006/044483 discusses an inflatable, expandable bag, constructed by providing a flexible material having a gas proof liner and a woven protective layer; forming a bag from the material; placing a sleeve over the material; and crimping the sleeve onto the material. EP0664417 discusses an expandable sealing element comprising a balloon provided with a stiffening means to counteract the expansion of the balloon; the stiffening element comprises a separate sheath of knitted material. EP0583819 discusses a device for closing the passage in a pipe, provided with an inflatable body of elastic material and a sleeve of less elastic material that envelopes the inflatable body. The sleeve is formed from a cylindrical part taken in at the end with slanting pleats.

Plugs in which the balloon-like element is provided with reinforcement lines in the outer surface thereof are also known. The lines may be anchored to end pieces, for example, as discussed in WO2005/003617, where a plurality of concentric layers of reinforcing lengths are provided in the thickness of the balloon's wall. In another example as discussed in US2005/0229985, an inflatable, flexible device is made from a latex body provided with a fibre or mesh reinforcing structure supplied as a thread or line winding as a pre-knitted mesh or randomly applied fibres. The manner of manufacturing such a balloon-like element is likewise time-consuming and costly.

Useful methods of manufacturing inflatable closing plugs for pipes are discussed in prior published patent U.S. Pat. No. 5,477,886, the contents of which are hereby included by reference. Generally in the discussed method, a balloon-like element is inflated to a predetermined pressure,
   a line or a group of lines with low elasticity is laid from the one end of the balloon to the other end of the balloon, and
   the line or lines is or are adhered to the surface of the balloon e.g. with latex.

According to more specific embodiments discussed therein it is possible a) to spray the line onto the surface simultaneously with the latex; b) to spin lines from fibres prior to spraying, adhere them with latex and subsequently arrange them on the surface of the balloon; c) to draw a single line from a supply and wind it around the balloon ends using a winding arm so that a large number of line windings can be arranged on the balloon surface; or d) a plurality of reinforcing lines are applied to a balloon like element by making use of an annular element having a plurality of circumferentially oriented guide holes for multiple lines, the balloon is passed through the annular element and a plurality of axial lines are laid on its surface and fastened by rings at either extremity.

Of these methods, the method of winding a single line around the balloon has been found to be the most effective and useful in practice. However, there exist a number of problems with this method. In order to adequately reinforce the balloon a sufficient number of line windings must be provided around the balloon. Depending upon the expected external and internal pressures the plug is to be subjected to and upon the size of the balloon, the number of windings may typically range from 100 to several hundred-thousand, with some balloons having 400,000 windings; and more common balloons having in the range of 10,000 to 20,000 windings. The application of so many windings is time consuming and thus costly.

Additionally, according to the prior process, only one type of line can be added as the reinforcing material at any one time. This limits the balloons to having only one type of line or to having distinct layers of different line. The provision of different line types requires a halt in the process to change the line, and is also limiting because the process is unable to provide a blend of lines within a single layer of windings. In particular in some applications it may be desirable to provide conductive materials (comprising metals or graphite) as part of the sheath This may require the use of special materials for the lines, which may be expensive or have compromised properties as a result of the inclusion of conductive materials. It may also or alternatively require repeated line changes.

Known plugs also suffer from the use of large quantities of adhesive used to adhere the lines to the surface of the balloon-like element. A preferred adhesive material is latex and the use of excess material leads to increased costs. It may also lead to the provision of plugs having unnecessarily thick and non-supple walls making them difficult to manipulate into and out of position in a pipe. It also increases production time because of drying requirements.

The use of excess adhesive may also lead to an uneven, or exaggeratedly uneven, spread of the adhesive over the surface of the balloon-like element. This is particularly the case with certain existing winding procedures which, for large diameter balloons, are carried out with the balloon suspended vertically. The latex or other adhesive used has a tendency to flow towards the lowest point of the balloon leading to particularly thick walling in that area. This again makes the plug less supple, and also may lead to poorly shaped plugs, for example pear shaped plugs because of a build up of adhesive at one end.

A further problem associated with known plugs is that the finished surface of the plug is often rough where the wound reinforcing line has bunched into troughs and furrows on the balloon surface, instead of lying evenly spread. This can increase the friction coefficient of the plug's surface and result in insertion and removal difficulties.

It has also been found with known plugs that, as a result of the manufacturing processes, a build-up of line occurs at the balloon ends or poles where the wound line overlaps. In particular on high-pressure balloons having large numbers of windings, the increased thickness at the poles makes the plug less flexible and difficult to collapse to a small diameter. The deflated plug may be difficult to manipulate through pipe inlets, outlets, saddles etc.

As mentioned above, U.S. Pat. No. 5,477,886 also discusses a method of simultaneously applying multiple lines to a balloon. However, the number of line lengths that can be laid onto the balloon surface is highly restricted by the number of eyelets that can be provided on the annular member so that adequate reinforcement is not achievable.

Methods of winding or wrapping objects in which a band or strip is used are also well known. By winding a strip, a larger area can be covered with a given number of windings than when winding with a line. Winding a flat strip onto a three dimensionally curved surface is however problematic unless the strip is elastically deformable. If the strip is substantially inextensible it will not lie flat on a spherical surface and ridges and pleats may appear. Under tension, the distribution of forces within the strip is unlikely to be ideal, making such a procedure unsuitable for the manufacture of inflatable plugs.

The invention has for its object to obviate at least some of the above stated drawbacks.

BRIEF SUMMARY OF THE INVENTION

According the present invention there is provided a method of manufacturing an inflatable plug in the form of a balloon-like element of elastic material, comprising the steps of: providing a preform defining an axis having two poles, winding at least one low extensibility line around the preform whereby the winding plane intersects the axis and passes adjacent to each pole and whereby during winding, the preform and winding plane rotate with respect to one another to cover substantially the complete preform with windings, spreading the windings to reduce overlap in at least the polar regions and securing the line in an elastic matrix to form a peripheral wall. The spreading of the windings in the polar region leads to the windings being deposited in bands rather than individual windings overlapping one another. This may serve to reduce the overall thickness of the peripheral wall adjacent to the pole leading to a more even distribution of thickness over the balloon periphery. Such thickness reduction is particularly important in high pressure plugs where hundreds of thousands of windings may be applied—spacing every second winding an additional distance from the pole can already lead to a factor two thickness reduction adjacent the pole. Other advantages may also be enjoyed as a result of the spreading of the windings in the polar regions. In particular, less matrix material e.g. latex is required leading to reduced cost and weight. Furthermore, the drying or curing time may also be reduced.

The line is wound around the preform in meridian fashion. That is, each winding encircles the preform multiple times at various angular positions about the axis. In this context, a single winding is counted as a line encircling the preform running from a first pole, passing the second pole, and returning to the first pole. It is noted that a line running only from one pole to the other does not encircle the preform and is not considered to be a winding in respect of the present invention. It should be noted that reference to "meridian fashion" is in fact a quasi-meridian path, since the winding plane is usually tilted slightly with respect to the axis. As a result, it does not necessarily directly intercept the pole but passes instead at a slight distance thereto. In general, the poles themselves are reserved for connections to and fixturing of the plug although it is not excluded that these connections may be provided elsewhere and that the windings also cover the poles.

Various possibilities may be considered for spreading the windings. In a first embodiment the windings may be spread by laterally moving the preform or winding plane with respect to one another in a direction generally perpendicular to the winding plane. A mechanical arrangement may be provided to move either the axis or the winding plane. When winding with a single line, a relative movement of 20 mm without rotation of the preform can lead to formation of a 20 mm wide band of windings at a given angular position on the preform. If the preform rotates during winding, the windings are spread laterally from the pole at different angular positions. Nevertheless a similar thickness reduction is still achieved.

In an alternative embodiment, the windings are spread by tilting the axis and winding plane towards and away from one another. This may again be achieved by appropriate mechanical mounting of the axis or winding plane. In this manner, spreading of the windings in the polar regions may be achieved while overlap takes place elsewhere e.g. around the equator. Such overlap is less disruptive since the windings density over the remaining surface of the peripheral wall is much lower than in the polar region. Nevertheless, measures may be taken in order to avoid all overlapping lines occurring at a particular region on the plug.

In a yet further embodiment, the line may be spread by a spreading edge. Such an arrangement may be used where the line comprises a number of separate fibres, strands or threads that can be easily flattened or spread out to form a tape like web. The spreading edge may be in the form of a knife edge, a roller, a comb or the like and may be convex, concave or angled according to requirements.

According to an important aspect of the invention a plurality of lines may be separately supplied and simultaneously wound around the preform. The lines may be supplied from individual spools but may be also provided on a single spool. By increasing the number of lines being wound simultaneously winding may take place more quickly. This is of considerable importance for large diameter plugs where the total number of windings to be applied is very high and where they must nevertheless be evenly space over the whole of the peripheral wall. In this context, separate supply of the lines means that each line may be subject to its own tension and speed of paying out. This allows the lines to be spread over different paths on the preform surface which may differ in length.

In a particularly advantageous arrangement, a plurality of lines is supplied from respective supplies and maintained generally parallel to one another during winding. In order to achieve this, the respective supplies are allowed to rotate about one another during winding to prevent twisting together of the lines. For a single winding of the preform, if the supplies also rotate once there will be no relative twisting of the lines and they can be guided to lie substantially parallel to one another spread over the balloon surface. This may be achieved with a comb structure or the like. In the present context, comb is used to indicate an element that is able to guide a number of lines parallel to one another. It is not intended to be limiting in shape or dimensions and may include eyelets, holes, loops or any suitable device that can achieve such guiding function. By depositing a plurality of lines in this manner, the advantages of wrapping using a strip may be achieved without certain disadvantages. In particular, the separate supplies allow the lines to conform to the curved surface of the preform such that in the finished product each line will be substantially equally tensioned.

Although the above methods of spreading the windings to reduce overlap have been described individually, it will be understood that they may also be combined in order to achieve further advantages.

The line of the present invention is a length of flexible material that is windable about the preform. The term includes lines that are comprised of or consist of cord, strands, string, thong, twine, yarn, or metal wire. In particular the term includes yarns composed of spun fibres; cords composed of strands twisted or woven together; and non-fibrous lines, such as metal wires. The lines are low-extensibility lines in that they each have a lower coefficient of elasticity than that of the matrix material.

The lines used in the present invention preferably comprise fibrous materials. For example, glass or carbon fibre. The currently most preferred materials are ultra high molecular weight polyethylene; as for example, Dynema™. Aramid fibre materials may also be useful, for example para-aramids and meta-aramids such as e.g. Kevlar™ or Twaron™.

Where a plurality of lines is used, each may comprise or consist of the same materials, or one or more of the lines may comprise or consist of a different material to the other lines. Also, each line may have the same or different line sizes, thicknesses, cross-sections, and/or extensibility properties than each of the other wires. Advantageously, a blend of different lines can thus be laid down to fine tune the characteristics of the reinforcement layer formed therefrom.

Various line weights may be employed according to the product to be produced. For Dynema™ a preferred range of weight is from 165 dTex for small plugs to 3×440 dTex for larger balloons. This may correspond to thickness ranges of the lines from 0.05 mm to 2.0 mm, more preferably 0.1 mm to 1.5 mm, and most preferably 0.2 mm to 0.8 mm.

As the windings are applied to the preform, neighbouring lines or windings are preferably spaced in at least the polar regions by 0.1 mm to 20 mm, more preferably 1 mm to 10 mm, even more preferably 2 mm to 7 mm. This spacing will of course depend generally on the size of the balloon and its pressure rating. The overall width over which the windings are spread may be referred to as a band. The width of the band may be defined as the range of distances that a winding can have from a respective pole. Thus, if the closest winding passes tangentially at a distance of 15 mm to the pole and the most distant winding passes at a distance of 25 mm to the pole, then the band has a width of 10 mm. Preferably the windings are spread over a band of greater than 10 mm for small balloons up to a band of 50 cm for large diameter balloons. In general the band is more than 2% of the working diameter of the balloon, but may be more than 5% or even 10% of this diameter.

The preform may be generally spherical having an axis passing between two poles. More preferably, it has an ovoid shape or even an elongate shape having a substantially continuous cross-section along the major portion of its length. For winding onto such an elongate shape the winding plane may also be elongate, and a winding head may be guided to follow an oval path.

A most preferred form of preform is an inflated balloon which may be formed of latex. After winding, and application of the elastic matrix, the balloon forms an integral part of the plug. The balloon can have a deflated shape of reduced cross-section, such shapes may include crosses, star shapes, ovals, circles with inwardly bent folds, and circles. In this manner, the resulting inflatable plug will also assume a similar deflated shape allowing easy insertion through narrow passageways. It will also be understood that other preforms may also be considered, in particular preforms that do not become integral with the finished plug and which are removed during or on completion of the manufacturing procedure.

In a preferred embodiment of the invention the preform is mounted on an axle. As the windings are applied, the preform is axially rotated about its axis so that the lines are wound around the preform at various angles of rotation of the axis. In this manner the lines can be wound around the whole surface of the preform in meridian fashion. The axial rotation may either be a continuous rotation during winding, or it may be a step-wise rotation. For example, a step rotation may take place after each band of winding is completed.

According to a further aspect of the invention, there is disclosed a method of manufacturing an inflatable plug in the form of a balloon-like element of elastic material, comprising the steps of providing a preform defining an axis having two poles; winding at least one low extensibility line around the preform in a winding plane, whereby the winding plane intersects the axis and passes adjacent to each pole; and rotating the preform about the axis during winding to cover substantially the complete preform with windings, wherein the axis is generally horizontal and is at least partially supported at locations on either side of the winding plane. By supporting the preform at its axis on either side of the winding plane, relatively large preforms or balloons may be wound in horizontal position. In the past, such large balloons had to be wound vertically and application of an adhesive matrix material was complicated and labour intensive. Furthermore, there was a tendency for the matrix material to flow to a lower point of the plug leading to thickened walls at the lowermost end. In general, the lines will be deposited by a winding head carried by a rotating winding arm or guide. In this case, one of the supports will be located within the volume defined by the winding plane and the path of the winding arm. A winding apparatus for manufacturing inflatable plugs incorporating such a support is also independently claimed herewith.

During or after arranging the windings on the surface of the preform a layer of matrix material, for instance latex, polyurethane or the like, is sprayed or brushed over the preform so that the line or lines adhere to each other. When used in conjunction with a balloon-like preform comprising latex—either synthetic or natural—the lines are preferably adhered to the surface of the balloon-like element with a latex based adhesive. Under certain circumstances, the preform and the matrix may not necessarily be adhered to one another.

In preferred embodiments, 3 or more, preferably 4 or more, most preferably 6 or more, separate lines are simultaneously wound around the balloon-like element. This ensures that the required number of windings can be laid down in a speedy process, and also allows for a blending of different types of lines, for example to incorporate electrically conductive lines that drain static. This is especially useful where the plug is to be used in an environment with explosive materials. Where separately supplied lines are to be used, it is preferred that 20 or fewer, more preferably 15 or fewer, and possibly no more than 10, lines are simultaneously wound around the balloon-like element. This may ensure avoidance of the need for an overly complicated apparatus for carrying out the operation.

The method of the invention may also comprise attaching a media inflow conduit to the peripheral wall. In general this connection may be made at one of the poles although this need not always be the case. The media inflow conduit may comprise a mechanical connector for releasably connecting to a media source. Preferably the media inflow conduit is a high pressure hose capable of withstanding internal pressures greater than 1.5 bar. In certain applications it may be capable of withstanding pressures greater than 5 bar or even as much as 25 bar. The skilled person will be generally familiar with the correct rating of hose to use depending on the required use. It will be understood that the media inflow conduit may also be provided as part of the preform.

According to another aspect of the invention there is provided an inflatable plug for closing pipes that may be obtainable by the method discussed above. The plug comprises a balloon-like element of elastic material having a peripheral wall, an axis and opposing poles, the peripheral wall comprising a matrix of elastic material reinforced by a plurality of windings of low extensibility line wound in meridian fashion to pass tangentially to the poles and at a distance therefrom. According to the invention, individual windings are distanced from the pole by a range of different distances forming a band of reduced winding overlap in the polar regions. A media inflow conduit is provided through the peripheral wall. As a result of the reduced overlap, the relative flexibility of the wall around the poles can be significantly improved. Plugs manufactured in this manner may be collapsed to a smaller diameter than those of similar size and pressure rating produced according to conventional winding methods. This allows them to be more easily inserted through smaller holes with reduced risk of damage or loss. Additionally, due to the reduced winding overlap, relatively less matrix material is required. This reduces cost and production and drying time. It also reduces the weight and further increases the flexibility of the resulting plug.

In particular, these advantages are of greater significance for large diameter and high pressure plugs, since the quantity of line wound onto the plug is also greater. For high pressure balloons rated above 4 bar a thickness ratio of windings in the wall in the deflated state between thickest and thinnest wall portions may be reduced by 20% or more, from more than 6 to less than 5.

In one embodiment the plurality of windings is formed by one single continuous line. In this context it will be understood that the single line may be joined or spliced e.g. when a supply spool is exhausted during winding. A single line has advantages in that winding can be simplified and risk of entanglement is limited. It is also relatively easy to maintain substantially equal tension at all points on the balloon since the single line can equalise its tension around the balloon periphery.

In another embodiment the plurality of windings comprises a number of separate lines wound parallel to one another and spread within the band. In this context, separate lines is intended to indicate that the lines are separately supplied from separate spools or supplies and are not twisted or otherwise plied together. On the balloon periphery these separate lines can be observed as lying generally parallel to one another, forming a flattened band in the plane of the peripheral wall. In the case that lines of different composition are used, a winding of multiple lines may be more easily distinguished from the case where a single line is wound.

According to one aspect of the invention the band that is formed can have a width of at least 2% of the nominal working diameter of the plug. The inflatable plugs of the invention may vary considerably in size. Nominal working diameters may vary from 10 cm to as much as 3 meters or more. Nevertheless, the same principles of construction may apply although for very large balloons, maximum band width may be limited by other practical considerations. It will be understood that the practical width of the band will also depend partially on the shape of the polar region of the preform. Sloping poles will be less susceptible to winding with wide bands than relatively flattened regions. In certain circumstances it may be preferable to utilise a band having a width of 5%, 10% or even 20% of the nominal working diameter.

The inflatable plug is preferably provided with an axial elongation device for biasing the plug into an extended state when deflated. The axial elongation device may take the form of a spring provided within an interior of the balloon-like element or within the peripheral wall. It is more preferably provided with an axially aligned telescopic guide shaft. Such an elongation device may make it easier to insert the plug into confined spaces.

According to another aspect of the invention there is provided an apparatus for forming an inflatable closing plug, the apparatus comprising a winding head rotatable around a path defining a winding plane, the winding head being arranged to dispense one or more continuous lines, a holder for supporting a supply of line, a guide arrangement for supplying the line to the head, an axis for rotationally supporting a preform at a shallow angle with respect to the winding plane such than the winding plane intersects the preform and a spreading arrangement arranged to locate the windings on the preform over a band having a width perpendicular to the winding plane at least on passing close to the axis. Although reference is made to rotation of the axis and winding head, it will be understood that in the context of such winding, all movements are relative and any kinematic variations of these movements are also covered by the present invention.

According to one embodiment, the spreading arrangement may comprise means for moving the head or axis with respect to one another in a lateral direction generally perpendicular to the winding plane. Operation of such a spreading arrangement at a given angular location of the balloon allows a band of windings to be deposited having a width perpendicular to the winding plane. The relative movement may be achieved by advancing the winding head during winding by any appropriate means. To this end the winding head may be mounted on a winding axis and moved backwards and forwards in the direction of the winding axis e.g. on a slide. Alternatively, the preform axis on which the preform is mounted may be laterally moved.

According to an alternative embodiment the spreading arrangement can comprise means for tilting the axis and winding plane towards and away from one another. In this manner the windings can form a band at the poles and cross over one another at an intermediate position on the periphery. As in the case of lateral movement, the tilting movement may take place at a winding axis or at the preform axis.

In another embodiment, the spreading arrangement may comprise a spreading edge. The edge as described above may be carried by or form part of the winding head.

In certain embodiments the holder may comprise a plurality of spool seats arranged to support separate spools or line for separate supply to the head. In this context, reference to spools is not intended to be limiting on their shape or manner of mounting and is intended to cover any supply of line that may be required, including bales, reels, bundles, rolls and the like. The spool seat may comprise a pin or the like. It is particularly desirable that the separate spools are all free to supply line independently of one another. In this manner, each spool can supply line at a required rate and the tension in one line may not be influenced by that of another line. Three or more, preferably 4 or more, most preferably 6 or more, spool seats are provided and the guide is adapted to space and guide three or more, preferably 4 or more, most preferably 6 or more, lines simultaneously to the head.

In one particular embodiment, the holder and spool seats may be arranged to rotate together with the head. The guide may also be mounted to rotate together with the spool seats. In this manner, the separate spools or reels may supply the line independently to the winding head without relative twisting of the individual lines. The spreading arrangement may then comprise a comb as defined above, for separately dispensing the plurality of parallel lines from the head and for laying them down as a band onto the preform.

In a most preferred construction, the winding head, guide arrangement and spool seats are attached to a conveyer that follows a continuous path for movement of the guide about said object. The conveyor may follow any desired path such as a circle, ellipse or oval and may be arranged to correspond generally to the shape of the preform being wound. For winding onto an elongate balloon an elongate conveyor path is desirable. The conveyor may comprise a belt e.g. a chain belt.

In a conveyor embodiment the guide may comprises a guide arm that is attached to the continuous conveyer and carries the winding head. The guide arm may extend outwardly from the conveyor such that the winding plane is distanced from the conveyor by at least half the width (the radius) of the preform.

According to a further embodiment, the axis is arranged generally horizontally and supported on either side of the winding plane. Preferably a support for the axis is provided in a region defined between the winding plane and a path of the guide arm. If the guide arm is driven by a drive arrangement the support may be fastened to a non rotating part of the drive arrangement. In a conveyor embodiment the support may be carried by a non-rotating part of the conveyor.

According to a preferred embodiment, the spreading arrangement is adjustable in order to vary the width of the band of lines to be applied. This may be achieved by adjusting the amount of relative movement of the head and axis. Alternatively or additionally it may be achieved by adjusting the spreading edge to spread the line or lines in a wider or narrower band. A preferred embodiment of the head comprises a spreading head or comb arrangement that is pivotable in order to adjust the width of the band.

The apparatus according to the invention may also be provided with a coating device for applying an elastic matrix material to the preform and/or the windings. The coating device may be in the form of a brush, spray, roller or any other supply adapted for dispensing the chosen material in a suitable manner.

The apparatus may also be provided with a control arrangement adapted to control operation and movement of the winding head, axis, guide arrangement, spreading arrangement and/or coating device. The control arrangement may be adapted to perform any of the method as described above and may be implemented in software on a microprocessor or the like or in hardware in the form of mechanical interaction. Preferably the control arrangement is at least arranged to match a rotation of the winding head to a rotation of the axis in order to distribute the windings onto the preform in a desired manner.

Another aspect of the invention is found in a method of closing a pipe, comprising inserting into a pipe an inflatable plug as discussed above, and inflating the plug with pressurised material.

BRIEF DESCRIPTION OF THE DRAWINGS

The features and advantages of the invention will be appreciated upon reference to the following drawings, in which:

FIGS. 2A and 2B are end views of a balloon wound with the apparatus of FIG. 1;

DESCRIPTION OF ILLUSTRATIVE EMBODIMENTS

Figure 1:
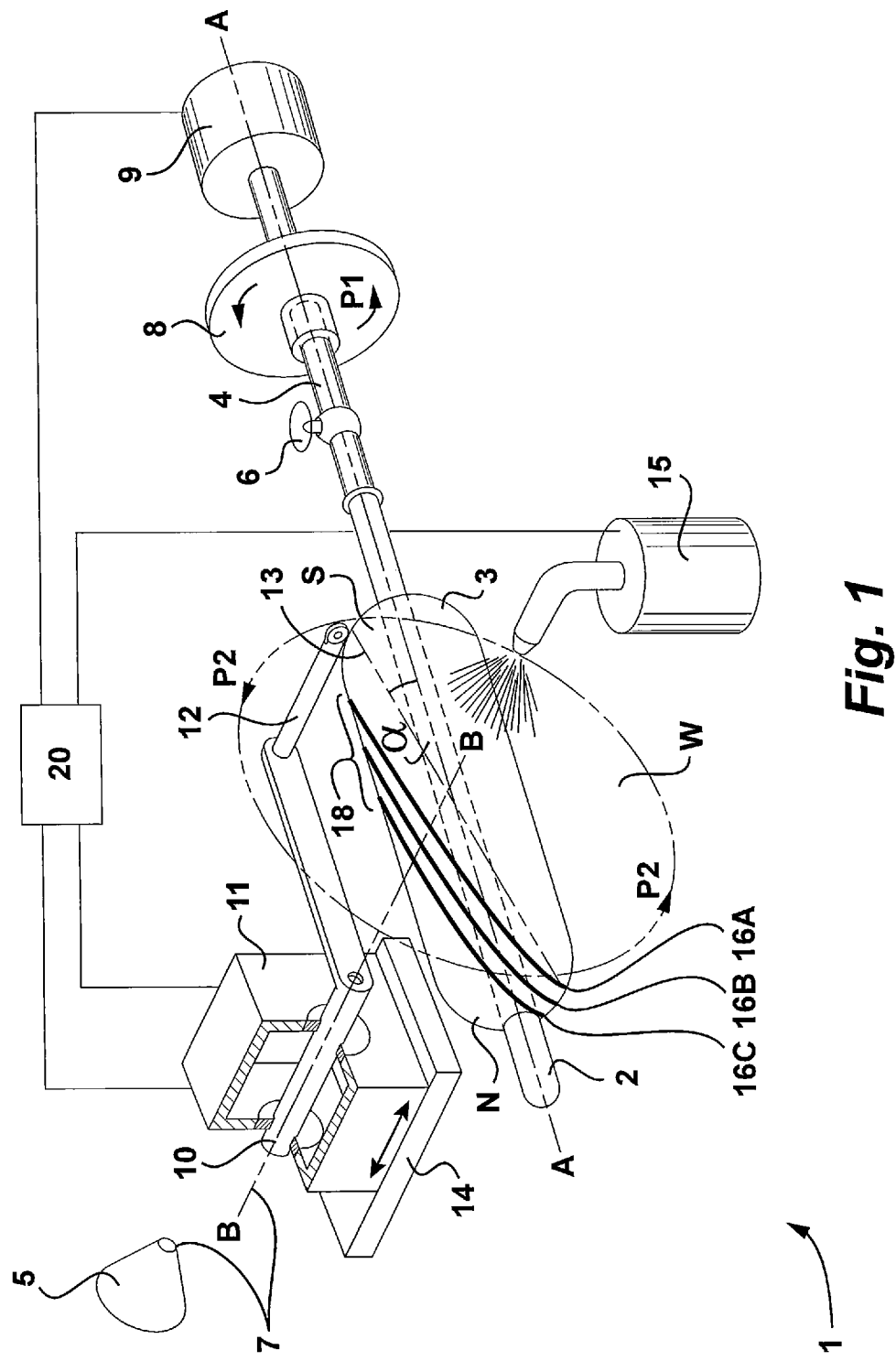
FIG. 1 is a schematic perspective view of a first embodiment of an apparatus for forming an inflatable closure plug.

Designated with the numeral 1 in FIG. 1 is an apparatus for forming an inflatable closure plug according to a first embodiment of the invention. According to the figure there is shown a balloon-like element 3 which serves as a preform on which to wind a closing plug. The balloon 3 has a first pole N closed by closure 2 and is connected at its other pole S to a shaft 4. The shaft 4 serves as an inlet conduit into an interior space within the balloon 3 and is provided with a closing valve 6 which can be placed in an open or closed position. In the situation of FIG. 1, the balloon 3 is partially inflated to its nominal working diameter and the valve 6 is closed. In this state the balloon 3 is generally elongate and round in cross-section.

The shaft 4 can extend wholly through the balloon-like element 1 into the narrowed end portion 2 of the element, although this is not strictly necessary. The shaft 4 is inserted into a rotatably mounted carrier 8 which can be rotated in continuous or stepwise manner in the direction of the arrow P1 by a motor 9 about preform axis A-A. The motor 9 may also rotate in the reverse direction counter to P1.

A moveable guide arm 12 is arranged to rotate around a winding axis B-B. The arm 12 has a guide eye 13 which during rotation follows a path designated with the arrow P2 defining a winding plane W. The centre of this path coincides with a point of intersection of the winding axis B-B and the preform axis A-A. The axes A-A and B-B are positioned with respect to one another such that the winding plane W passes through the balloon 3 and is angled at a small angle α to the preform axis A-A. As a consequence, the eye 13 will pass close to but not over the pole S on the rear side of the balloon 3 and it will pass the pole N at the front side of the balloon.

The arm 12 is mounted on a winder shaft 10 and is driven to rotate by a winder motor 11. A line 7 can be unwound from a spool 5 and is guided through the winder shaft 10 and an interior passage in arm 12, to the eye 13. The line is formed of Dynema™ fibre of 165 dTex grade. Winder motor 11 is mounted on a bed 14 to shuttle backwards and forwards along the winding axis B-B. Movement of the winder motor 11 along the bed 14 may be by any conventional means such as a solenoid, linear motor, endless screw or the like. Control of the motor 9, winder motor 11 and bed 14 is provided by a controller 20. A latex spray device 15 is also located adjacent to the balloon for operation as described below.

In use, an end of the line 7 is fixed in relation to the periphery of the balloon 3. The winder motor 11 is operated to rotate the arm 12 causing the guide eye 13 to transcribe a path around the winding plane W. As the arm 12 moves, line 7 is withdrawn from eye 13 by the tension caused by the fixing of the line 7 on the balloon. By ensuring that the passage through the winder shaft 10 and guide arm 12 is unrestricted, the tension required to withdraw line 7 from spool 5 may be relatively low. As a result, the line 7 may be applied as a relatively loose winding 16A to the balloon 3. As the arm 12 rotates around the balloon 3, the winder motor 11 also retracts on bed 14. This causes successive windings 16B, 16C to be applied parallel to winding 16A as a band 18.

After three rotations of arm 12, the winder motor 11 has fully retracted on bed 14. The motor 9 then acts to rotate the balloon 3 one step forwards around the preform axis A-A corresponding to an angular rotation of 11 degrees. At the same time, spray device 15 is actuated to spray a light coating of latex onto the surface of the balloon 3. The arm 12 continues to rotate in order to apply three further windings as the winder motor 11 slides forwards on bed 14. After 17 steps of the motor 9, the balloon will have rotated half a turn and will be completely covered with windings 16 and latex. Operation continues for a number of further revolutions until the total number of windings corresponds to that required to achieve the desired pressure rating for the plug.

After winding is completed, the shaft 4 is removed from sleeve 7 and the balloon 3 is allowed to dry in order to cure the latex. Thereafter appropriate fittings for the intended use are applied e.g. a high pressure media inlet hose.

FIG. 2A illustrates an end view onto pole N of the balloon 3 taken along axis A-A. As can be seen, closure 2 has a diameter d. Balloon has a nominal working diameter D at which winding takes place. First winding 16A is placed onto the balloon 3 such that it passes the pole at a distance Ra. Winding 16B is placed at a distance from the pole of Rb. Winding 16C is placed such that it is tangential to the closure 2 at distance Rc corresponding to d/2. The three windings 16A, B, C thus form a band having a width b of Ra-Rc. As it will be understood, the width b corresponds to the distance moved by the winder motor 11 as it reciprocates on bed 14.

FIG. 2B is a view corresponding to FIG. 2A after the motor 9 has incremented forwards 4 steps and after a further 12 windings have been applied to the balloon 3.

Figure 3:
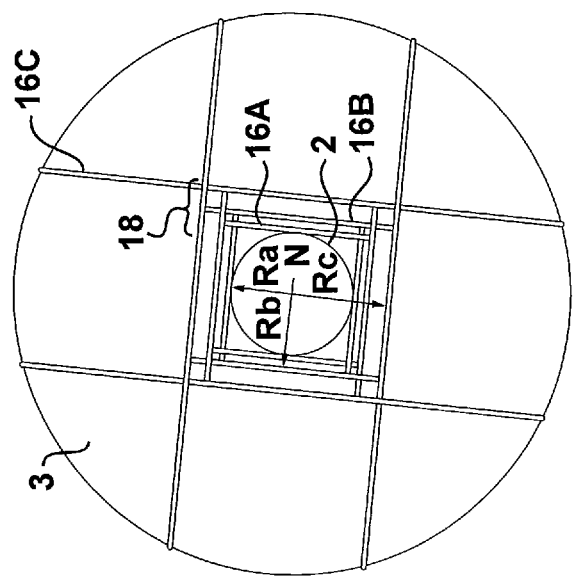
FIG. 3 is an end view of a balloon wound in an alternative manner using the apparatus of FIG. 1.

In the embodiment of FIGS. 1 and 2, the winder motor 11 reciprocates on bed 14 at a given angular position of the motor 9 and shaft 4. In an alternative mode of operation depicted in FIG. 3, the motor 9 is controlled to rotate the shaft 4 a step at a time without movement of the winder motor 11 on bed 14. For the sake of simplicity, in FIG. 3 the situation is shown in which each step is of 90° and a single winding 16 is placed at each step. It will however be understood that in reality many smaller steps may be taken and more windings may be placed on each layer. Initially a first series of four windings 16A is placed at a distance Ra from the pole N to form a first winding layer on the balloon surface. Thereafter the winder motor 11 is displaced and during a second rotation of the shaft 4, a second series of windings 16B are placed at a distance Rb from the pole in a second layer lying over the first layer. During a third rotation, a further series of windings is placed at distance Rc to form a further layer. Although the windings 16 are placed in a different sequence, they still form a band 18 and have the effect of reducing the overall thickness of the region around the pole by a factor of three compared with a similar number of windings all located at distance Ra.

The skilled person will understand that many alternative ways of controlling deposition of the windings may be contemplated that still achieve the same effect of reduced winding overlap around the poles N, S. Furthermore, although the movement of the winder motor 11 to three different positions has been described, the skilled person will understand that it may be moved to any number of intermediate positions. It will also be understood that the winder motor 11 can reciprocate even while the arm 12 and the motor 9 rotate.

Figure 4:
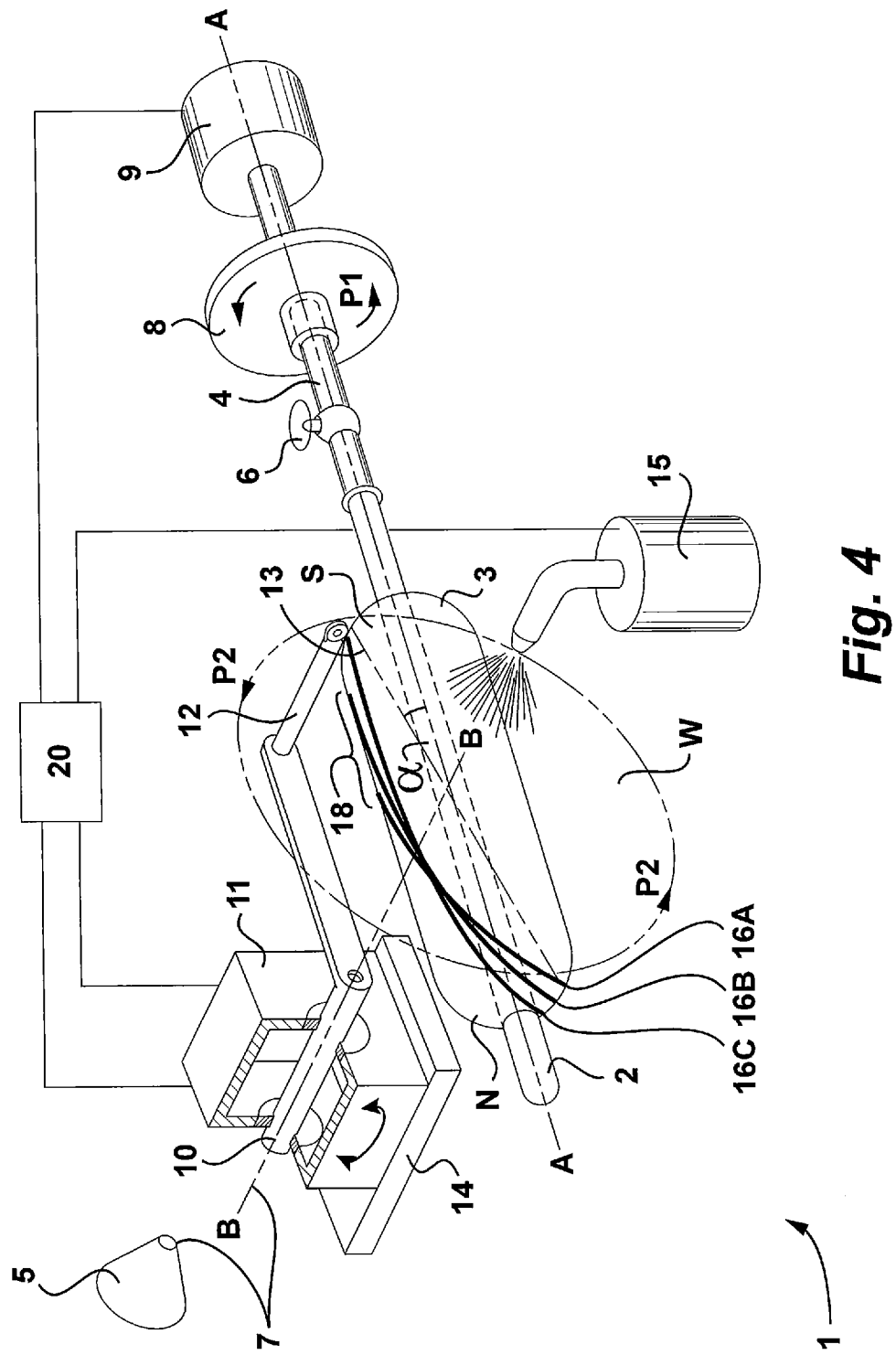
FIG. 4 is a schematic perspective view of an alternative version of the apparatus of FIG. 1.

According to FIG. 4, there is shown a variation of apparatus 1 according to an alternative embodiment of the invention. The apparatus of FIG. 4 differs from that of FIG. 1 only in that the winder motor 11 is mounted to pivot on bed 14 rather than reciprocate. As a result of such pivoting, the angle α between the winding plane W and the preform axis A-A can be increased and decreased.

Figure 5:
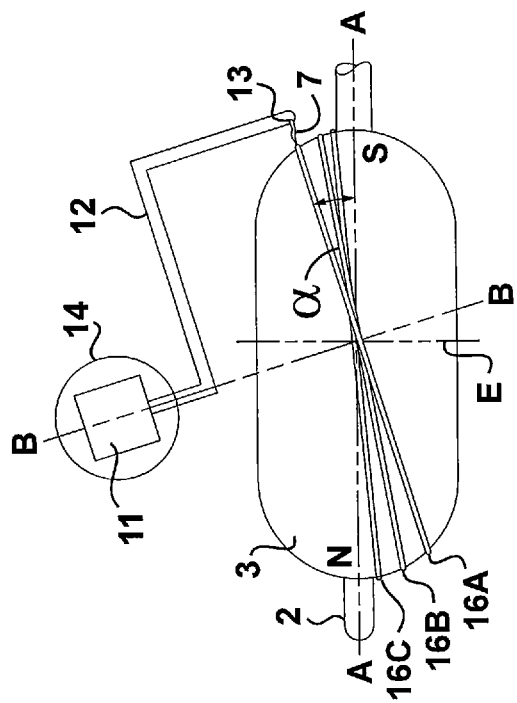
FIG. 5 is a top view of a balloon being wound by the apparatus of FIG. 4.

FIG. 5 is a view looking downward onto the balloon 3 of FIG. 4. As a result of the pivoting of winding motor 11, windings 16 A, B, C are spaced from one another close to poles N, S in a similar manner to the first embodiment. In this case however, the windings cross each other at around the mid-point or equator E of the balloon 3. In this region, the winding density is lower than at the poles and overlapping of the lines may have less influence on the wall thickness. In general the lines are more widely spaced at the equator. Furthermore, due to natural variations in balloon shape, the crossing points rarely all come to lie exactly above one another and the effect on the final product is minimal.

Figure 6:
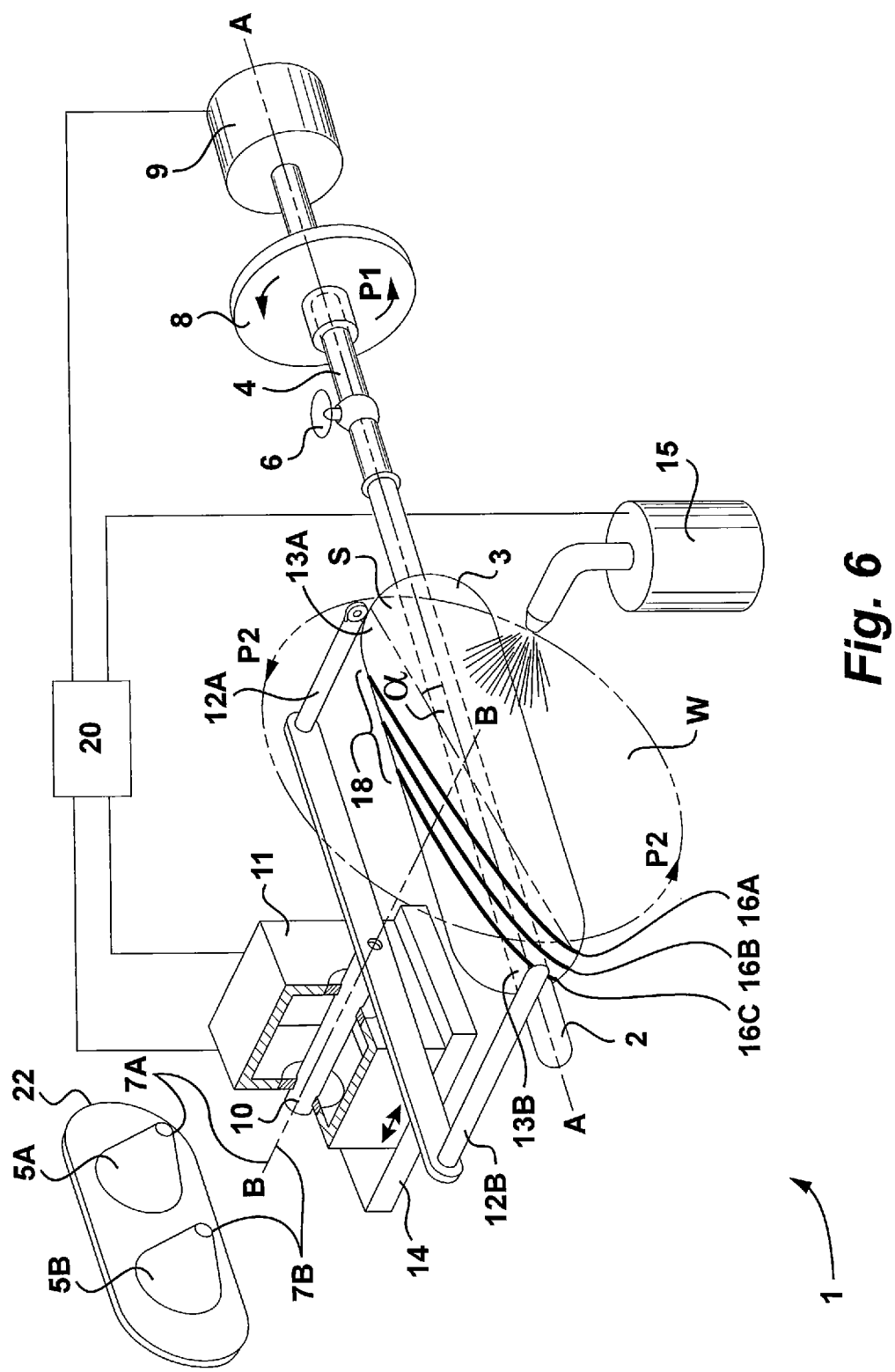
FIG. 6 is a schematic perspective view of a second alternative version of the apparatus of FIG. 1.

In FIG. 6, a second variation of the apparatus 1 is shown in which a pair of diagonally opposed guide arms 12A and 12B are connected to winder shaft 10. Each arm 12A, 12B has a guide eye 13A, 13B from which lines 7A, 7B are dispensed. In the variation of FIG. 6, both guide eyes are aligned in the same winding plane W.

The lines 7A, 7B are dispensed from two separate spools 5A, 5B. In order to prevent lines 7A, 7B from twisting together as the winder shaft rotates, spools 5A, 5B are mounted on a spool holder 22. Spool holder 22 and winder shaft 10 can then rotate together at the same speed, driven e.g. by a mechanical connection to the winder motor 11.

In operation, each rotation of the winder motor 11 causes two windings 16 to be deposited onto the balloon 3. The winder motor 11 may therefore retract on bed 14 after each half winding while still maintaining the same coverage. As will be evident, the total number of windings deposited at a given speed of winding is doubled leading to increased efficiency of operation. In a non-shown embodiment, the guide eyes 13A, 13B may be offset from one another perpendicular to the winding plane W. A full revolution of the winder motor 11 thus leads to two full windings being deposited parallel to one another, spaced by the offset of the guide eyes. The skilled person will understand that more spools and more arms may be used to further increase the rate of winding. The arms may be equally spaced around the winder shaft 10 or may be arranged adjacent to one another. Furthermore it may be noted that a single guide arm 12 may also carry multiple separate lines 7A, 7B . . . each to an individual guide eye 13 A, B . . . .

Figure 7:
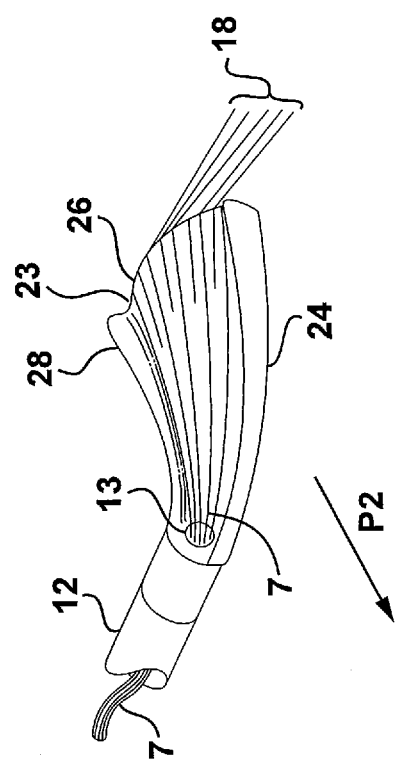
FIG. 7 is a perspective view of a first embodiment of a spreading edge according to the invention.

According to FIG. 7 there is shown a spreading edge 23 that may be affixed to the arm 12 of apparatus 1 to guide the line 7 on exit from the guide eye 13. The spreading edge 23 serves to spread the individual fibres of the Dynema™ line 7 as they are applied to the balloon 3. According to FIG. 7, the guide arm 12 is provided with a spatula attachment 24 connected to the guide eye 13. The spatula attachment 24 can be pivoted up and down with respect to arm 12 and fixed at a desired position by conventional means such as a screw or by friction. The spatula attachment 24 protrudes rearwardly according to the sense of rotation P2 to a curved spreading edge 23. Grooves 26 and upstanding borders 28 are provided leading from the eye 13 to the spreading edge 23.

In use, line 7 is dispensed from eye 13 during rotation of the arm 12. The line 7 is drawn over the spatula attachment 24 and spread by grooves 26 and by the rounded spreading edge 23. The line 7 is thus dispensed as a widened band 18 onto the balloon 3. According to the angular position in which the spatula attachment 24 is fixed, it will have a greater or lesser spreading effect on the line 7. The upstanding borders 28 prevent the line 7 from dropping off the sides of the spatula attachment 24. As applied to the variation disclosed in FIG. 1, the spreading edge 23 and reciprocally mounted winder motor 11 can both work in combination to provide even distribution of line 7 over the surface of the balloon 3.

Figure 8:
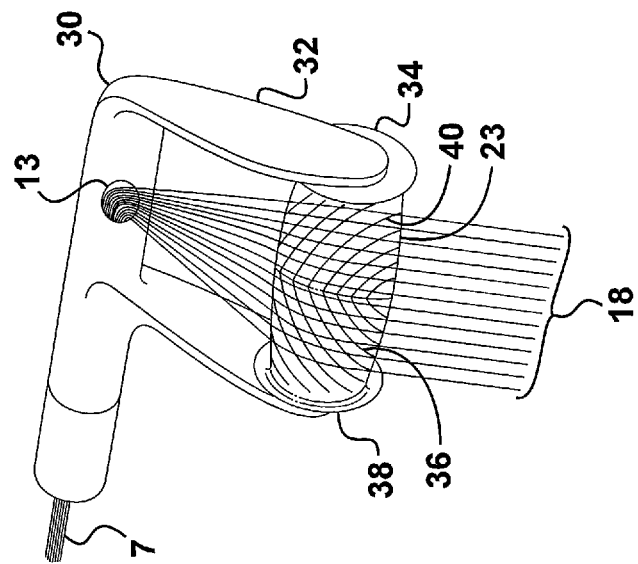
FIG. 8 is a perspective view of a second embodiment of a spreading edge according to the invention.

An alternative spreading edge 23 is depicted in FIG. 8 in the form of a roller attachment 30 which may also be affixed to the end of the guide arm 12 in a similar manner to the spatula attachment 24 of FIG. 8. The roller attachment 30 comprises a fork 32 supporting a freely rotating roller 34. Roller 34 has a convex portion 36 and upstanding edge portions 38. The convex portion 36 is provided with herringbone grooves 40. According to FIG. 8, the roller attachment 30 is pivoted in a downwards position towards the balloon 3, whereby the line 7 runs under the roller 34. It is understood that it could also be pivoted to an upwards position as is the spatula attachment of FIG. 7.

In use, the line 7 is drawn through the eye 13 and over the roller 34 causing it to rotate. As it rotates, the form of the convex portion 36 and the grooves 40 cause the line 7 to be spread outwardly into a band 18. The upstanding edge portions 38 prevent the line from slipping off the roller 34.

Figure 9:
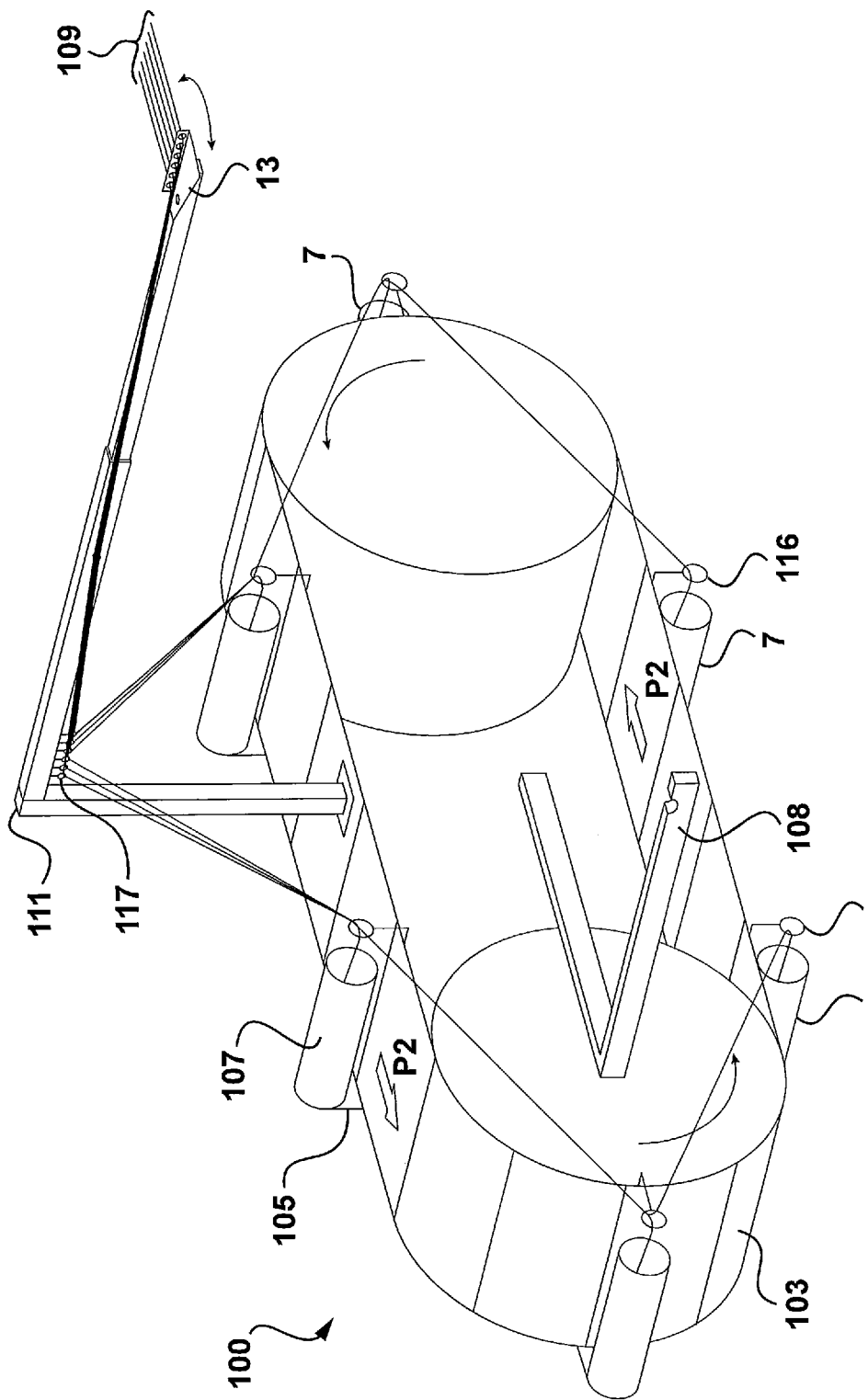
FIG. 9 is a schematic perspective view of a second embodiment of an apparatus for forming an inflatable closure plug according to the invention.

In FIG. 9 there is shown according to a second embodiment of the invention an apparatus 100 for simultaneously winding a plurality of lines about a balloon-like element. The apparatus 100 comprises a continuous conveyer 103, attached to which are a plurality of spool seats 105. In the illustrated embodiment six spool seats are shown, but fewer or more may be provided. On each of the spool seats 105 a spool 107 of line 109 is provided.

The line 109 from each spool seat 105 passes from its spool 107 to an arm 111. The arm 111 is provided at a distal end with a head 113 comprising a plurality of eyelets 115, seen in FIG. 10. Each line 109 runs through a separate eyelet 115. Guide loops 116 for the lines 109 are provided around the conveyor 103. A guide 117 is also preferably provided on the arm 111 in advance of the head 113 to keep the individual lines 109 separate, thus avoiding tangling.

Figure 11:
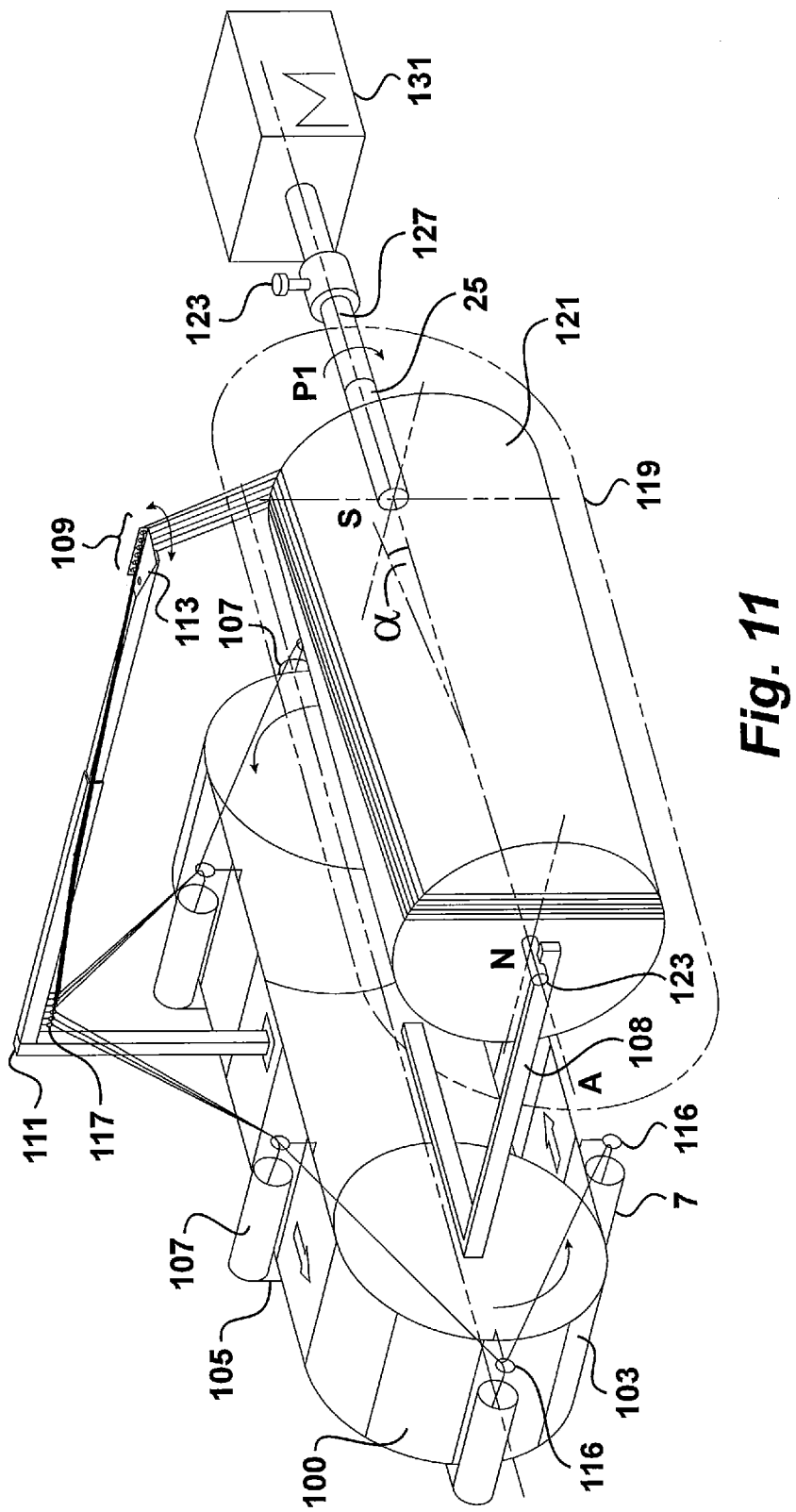
FIG. 11 is a view of the apparatus of FIG. 9 during winding of a plug.

The arm 111 is attached to the continuous conveyer 103. As the conveyer turns, as indicated by the arrows P2 in FIG. 9, the arm 111, the spool seats 105, and the spools 107 move together along the path of the conveyer 103. The head 113 travels along a winding path 119 dictated by the conveyer 103 and defines winding plane W as shown in FIG. 11. Also shown in FIG. 9 is a support 108 which is attached to a non-rotating body 104 of the conveyor 103.

Referring to FIG. 11, there is shown a partially inflated balloon-like element 121 which serves as part of a closing plug. The balloon-like element 121 is closed at its pole N by closure 123 and connected at its pole S to a shaft end part 127 that is releasably closed by a valve 129.

The shaft end part 127 is releasably connected to a motor 131 for continuous or stepwise rotation of the balloon-like element 121 in the direction of the arrow P1, about the major axis A of the balloon-like element. The balloon-like element 121 is supported at its other end by closure 123 which rests on the support 108.

The major axis A of the balloon-like element 121 is arranged at a predetermined angle α in relation to the winding plane W and partially penetrates through the plane to rest on the support 108. The balloon-like element 121 is thus placed such that as the head 113 moves along the path 119, it passes near to the pole N on a first-side of the balloon-like element, and near to the pole S on the opposite-side of the balloon-like element. The head 113 is thus led in a winding motion about the balloon-like element passing from the pole N to the pole S on a first side of the balloon-like element and from the pole S to the pole N on the opposite side.

To achieve winding of the lines 109 about the balloon-like element 121 the outer ends of the lines 109 that are passed through the eyelets 113 are fixed in relation to a surface part of the balloon-like element 121. The head 113 is moved along the winding path 119 so that the lines are pulled about the balloon-like element in a quasi-meridian fashion, at an angle α to the axis A. In this manner the lines 109 are deposited as a relatively broad band 118. As a result of the elongate path taken by the conveyor 103, the tension applied to the lines during winding onto an elongate balloon-like element is more even and increased tension at the poles is avoided.

The motor 131 acts to rotate the balloon either continuously at a varied or fixed rpm, or in step movements. Thereby the rotational movement of the balloon can provide meridian fashion windings of lines around the whole circumference of the balloon-like element. The rate and type of rotation determines the precise lie and spacing of each group of successive windings. It is preferred that the rotational movement is step-wise because this winds the lines closely in line with the axis A.

Figure 10:
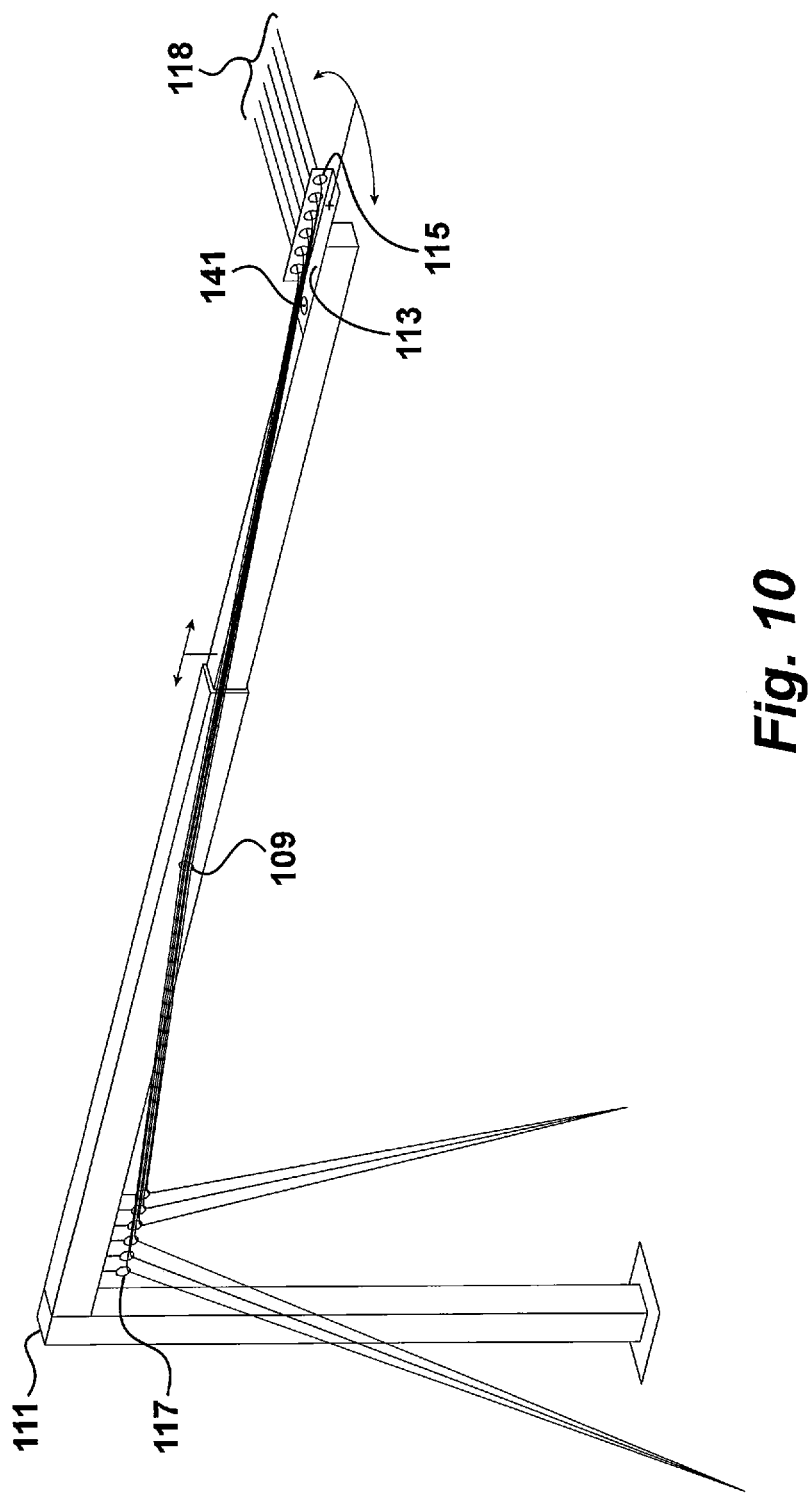
FIG. 10 is a partial view of the guiding arm of FIG. 9.

It is also possible to adjust the spacing of the lines in each group of simultaneously wound lines by adjusting the relative spacing of the eyelets 115 in relation to the surface of the balloon-like element 121. This is conveniently achieved as shown in FIG. 10. The head 113 is joined to the arm 111 at a pivot 141. The pivot 141 allows the angle of the head to be altered, and thereby the spacing of the eyelets 115 viewed from the surface of the balloon-like element to be altered. In this manner, the band 118 can be made broader or narrower as desired.

As in the previous embodiment, an adhesive such as latex can be sprayed by means of a spray device over the deposited line windings and the surface of balloon-like element 121 so that an intimate adhesion occurs between the line windings and the balloon-like element 121. Alternatively, the adhesive is brushed over the line windings and balloon surface. The adhesive can preferably be applied during the winding of the lines 109 around the balloon-like element 121, preferably with adhesive being applied after each winding.

In the disclosed embodiment, the balloon-like element 121 is inflated to predetermined size by connecting the shaft end part 127 to a pressure source, opening the valve 129, inflating the balloon-like element 121 to the desired size and subsequently closing the valve 129. The balloon-like element thereby acquires some firmness during winding of the lines. The predetermined size generally represents the nominal bore size that the plug is intended to close. It will of course be understood that winding in different configurations is also possible.

Figure 12:
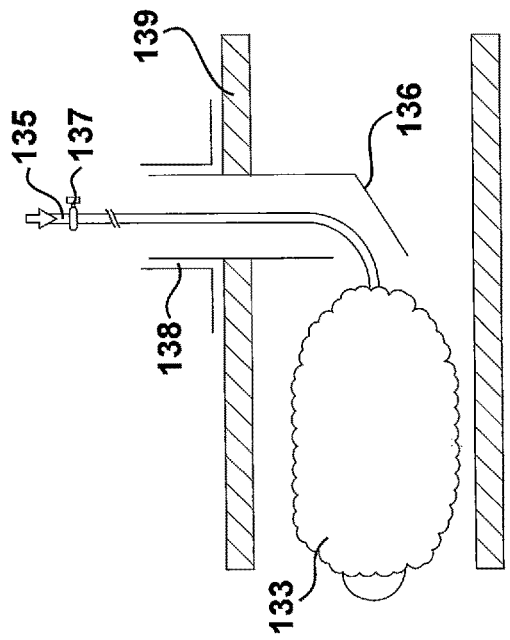
FIG. 12 is a view showing insertion of an inflatable plug into a pipe to be closed.
Figure 13:
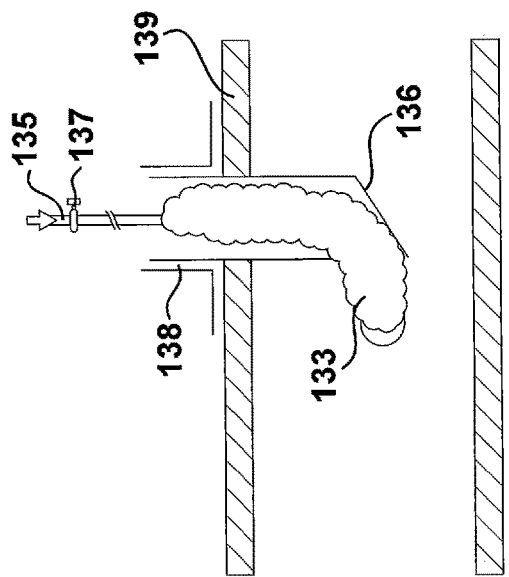
FIG. 13 is a view showing an inserted inflatable plug in deflated state.
Figure 14:
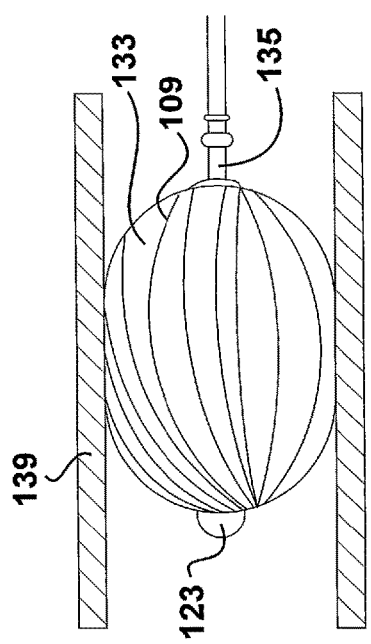
FIG. 14 is a view showing of the plug of FIGS. 12 and 13 in an inflated state.

In FIGS. 12, 13 and 14 the manner of application of the inflatable plug 133 obtained by the procedure of FIG. 11 is further described in combination with conventional flow stop equipment. The plug 133 is connected at the pole S onto a pressure line 135 which is in communication with a pressure source via a valve 137. Initially vacuum may be applied to flatten the plug 133 as much as possible, allowing it to be wound or compressed to a small diameter. The plug 133 is then pushed into an introducer shoe 136 which is inserted into a pipe 139 for closing via a relatively small opening made through the wall. This method as shown in FIGS. 12 and 13 uses a saddle 138, which is applied to the pipe 139 avoiding cutting through an entire section of the pipe. Alternatively the introducer shoe may be inserted via an existing branch connector. In such a method it is of great advantage to have a plug that is flexible and can be tightly folded or wound to a small diameter. The smaller the size of the introducer shoe, the smaller the hole that needs to be made into the pipe 139. In order to ensure the integrity of a pipeline it is generally preferable that the bored hole is no more than ¼ of the pipe diameter. Plugs having thick walls and rough outer surfaces can often prove difficult to insert in such a method. The plug 133 according to the present invention, by virtue of its reduced thickness polar regions can be inserted into a relatively narrower shoe than previous plugs of similar working size and pressure.

Once the shoe 136 is in position, the plug 133 may be advanced into the pipe 139. The plug 133 may be advanced in any convenient manner, by hand or using a rack and pinion type introducer mechanism (not shown). Because of its increased flexibility and smooth surface, the plug 133 of the present invention is also more convenient to advance through the shoe 136 and can more easily bend into alignment with the pipe 139.

By opening valve 137, compressed air, or another suitable inflation media, is admitted into the plug 133, whereby it stretches in substantially radial sense. This is shown in FIG. 14. Due to the line windings, which are made of material with little extensibility, the balloon will assume a melon-shaped form, whereby the outer periphery will become larger and touch against the inner wall of the pipe 139. The axial distance between the poles N, S reduces due to the inflation as the plug 133 becomes more spherical. As the plug 133 becomes constrained by the surrounding pipe, it takes up an elongate-melon-shaped form conforming to the inner walls of the pipe 139.

As a result of the restriction on the axial extension created by the reinforcement lines the balloon-like element 121—itself a very elastic material—will nestle firmly against the inner wall of pipe 139 and be able to build up pressure against the wall sufficient to resist possible pressure along the pipe. Because of the winding procedure presently described, the outer surface of the plug 133 is smoother, leading to improved pressure retention. After use, retracting the plug 133 from the pipe 139 is also facilitated for the same reasons.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:
1. A method of manufacturing an inflatable plug, comprising:
(a) providing a preform defining a preform axis having a first pole and a second pole, wherein the first pole is closed by a closure having a diameter d;
determining the length of the diameter d and d/2 of the closure;
determining the center of the diameter of the closure;
placing a wind A onto the perform such that it passes the first pole at a distance Ra, wherein Ra is a distance from center of the diameter of the closure to the wind A;
placing a wind B onto the perform such that it passes the first pole at a distance Rb, wherein Rb is a distance from center of the diameter of the closure to the wind B;
placing a wind C onto the perform such that it passes the first pole at a distance Rc; wherein Rc is tangential to the closure, which corresponds to about the diameter d/2 of the closure;
thereby forming a band consisting of the winds A, B, and C;
wherein the preform does not rotate during formation of the band;
wherein the winding plane intersects the preform axis and passes adjacent to one pole;
wherein at least one of a winding head and the preform is at least laterally displaced at a predetermined distance along an axis generally perpendicular to the winding plane during winding;
(b) rotating the preform a predetermined angular rotation after each band is formed;

(c) repeating steps (a) and (b) as necessary to obtain a required number of windings, wherein by repeating step (b) a further band is formed that overlaps a previous band; and
(d) securing the line in an elastic matrix to form a peripheral wall.

2. The method according to claim 1, further comprising: attaching a media inflow conduit to the peripheral wall at one of the poles, the media inflow conduit comprising a mechanical connector for releasably connecting to a media source.

3. The method according to claim 1, further comprising: attaching a media inflow conduit to the peripheral wall at one of the poles, the media inflow conduit comprising a mechanical connector for releasably connecting to a media source.

4. The method according to claim 3 wherein the media inflow conduit is a high pressure hose capable of withstanding internal pressures greater than 1.5 bar.

5. The method according to claim 3 wherein the media inflow conduit is a high pressure hose capable of withstanding internal pressures greater than 5 bar.

6. The method according to claim 3 wherein the media inflow conduit is a high pressure hose capable of withstanding internal pressures greater than 16 bar.

7. The method according to claim 1, wherein each winding in each band is at a different distance from the pole.

8. The method according to claim 1, wherein the windings A, B, and C cross each other at around the mid-point or equator of the perform.

9. The method according to claim 1, wherein the wind A is placed first onto the perform followed by the wind B and finally by the wind C to form the band and wherein the distance Ra is larger the distance Rb and the distance Rb is larger than the distance Rc.

* * * * *